United States Patent [19]  
Katsuzawa et al.

[11] Patent Number: 4,844,625  
[45] Date of Patent: Jul. 4, 1989

[54] STRUCTURE OF JOURNAL BEARING FOR MOTOR OPERATING AT HIGH REVOLUTIONARY SPEEDS

[75] Inventors: Yukio Katsuzawa, Hachioji; Michi Masuya, Hino, both of Japan

[73] Assignee: Fanuc Ltd., Yamanashi, Japan

[21] Appl. No.: 207,090

[22] PCT Filed: Oct. 14, 1987

[86] PCT No.: PCT/JP87/00772  
§ 371 Date: Jun. 6, 1988  
§ 102(e) Date: Jun. 6, 1988

[87] PCT Pub. No.: WO88/02945  
PCT Pub. Date: Apr. 21, 1988

[30] Foreign Application Priority Data  
Oct. 15, 1986 [JP] Japan .................. 61-243205

[51] Int. Cl.⁴ .................. F16C 3/14; H02K 5/173  
[52] U.S. Cl. .................. 384/473; 384/474; 310/90  
[58] Field of Search ............ 384/468, 473, 475, 474, 384/472, 465; 310/90

[56] References Cited  
U.S. PATENT DOCUMENTS 2,242,268 5/1941 Ray ..................... 384/468  
2,770,506 11/1956 Derner .................. 384/468  
2,986,433 5/1961 Herrmann ............... 384/468  
3,612,631 10/1971 O'Connor ............... 384/468  
3,940,191 2/1976 Tomioka et al. ......... 384/468

FOREIGN PATENT DOCUMENTS  
34-4703 6/1959 Japan .

Primary Examiner—David Werner  
Assistant Examiner—John M. Eghtessad  
Attorney, Agent, or Firm—Armstrong, Nikaido, Marmelstein, Kubovcik & Murray

[57] ABSTRACT

Disclosed is a journal bearing structure of a motor for operating at a high revolutionary speed and using an oil-air mix lubrication, wherein a front journal bearing (18) and a rear journal bearing (34) are accommodated, respectively, in a central portion of each of a front and a rear housing (30, 44) to journal an output shaft (14) of the high revolutionary speed motor, each inner portion (16, 32) of the front housing and the rear housing being constructed in such a way that it can be separated from and assembled to each remain outer portion, so that a machining thereof can be easily carried out, whereby a channel (20, 40) for supplying an oil-air mix, and a drain channel (22, 42), are provided in each inner portion.

4 Claims, 1 Drawing Sheet

STRUCTURE OF JOURNAL BEARING FOR MOTOR OPERATING AT HIGH REVOLUTIONARY SPEEDS

TECHNICAL FIELD

The present invention relates to a structure of a journal bearing for a motor, particularly to a structure of a journal bearing by which a channel for supplying an oil-air mix lubrication medium and a drain channel can be easily arranged within a motor operating at high revolutionary speeds.

BACKGROUND ART

Recently, the spindle of a machine tool must be able to rotate at a very high speed, and thus conventionally, a motor for rotating at a medium speed is used and an increased revolutionary speed is obtained by using a transmission mechanism and thus the spindle is driven at a high revolutionary speed.

Nevertheless, problems arise such as a time lag in the revolution of the spindle when the revolution speed of the spindle is changed, and so on, whereby the finishing accuracy of a workpiece is reduced. Therefore, a spindle motor directly connected to the spindle of a machine tool is required, and thus a journal structure capable of enduring a high revolutionary speed becomes necessary. A journal bearing under a conventional grease lubrication becomes overheated at a high revolutionary speed such as represented by the value Dmn, which is obtained by multiplying an average diameter of an inner diameter and an outer diameter of the journal bearing by the rotational speed, and is substantially equal to or more than one million (for example, where the average diameter is 50 mm and the rotational speed is twenty thousand r.p.m.), and normal driving cannot be maintained. Therefore, an oil-air mix lubrication which supplies air containing an oil mist is needed.

Although the oil-air mix lubrication is needed for a normal driving of a motor at high revolutionary speeds, as described hereinafter, it is difficult to provide a channel for supplying an oil-air mix and a drain channel for a complex oil-air mix lubrication in a conventional journal bearing structure mounted in a onepiece type motor housing.

DISCLOSURE OF THE INVENTION

Accordingly, an object of the present invention is to provide a journal bearing structure for a motor operating at a high revolutionary speed, wherein a channel for supplying an oil-air mix and a drain channel are easily arranged, thus solving the above problems.

In view of the foregoing object, the present invention provides a journal bearing structure for a motor operating at a high revolutionary speed, characterized in that each inner portion of a front housing and a rear housing of a motor is constructed in such a way that it can be separated from the remaining outer portion and can be assembled. A channel for supplying an oil-air mix and a drain channel are provided on each inner portion of the front housing and the rear housing. A journal bearing is mounted in each central side of the inner portion of the front housing and the inner portion of the rear housing. Each inner portion in which the journal bearing is mounted is inserted and set onto an output shaft of the motor, to thus act as a journal bearing structure using an oil-air mix in which the output shaft rotates and to serve as portions of the front housing and the rear housing, respectively. According to the above mentioned journal bearing structure, the housing portions for sustaining the front and rear journal bearings of the motor can be separated from the remaining housing portion of the motor and be machined, and therefore, a complex channel for supplying an oil-air mix, and a drain channel, which are needed for the journal bearing of the motor operating at a high revolutionary speed, can be easily provided.

BEST MODE FOR CARRYING OUT THE INVENTION

Figure 1:
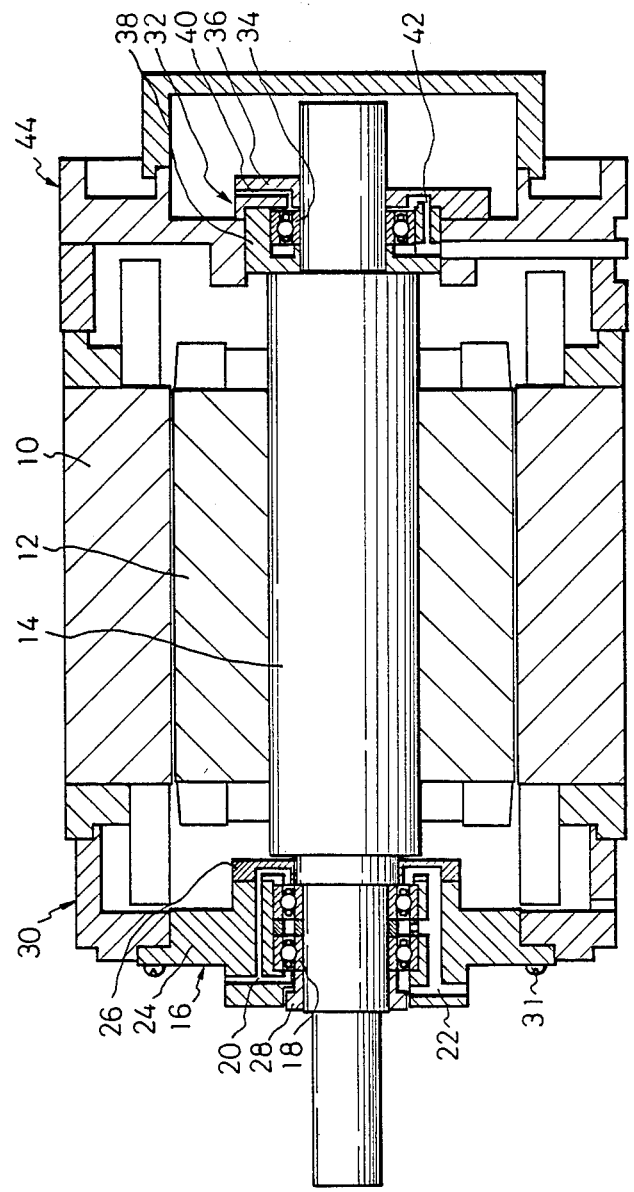
FIG. 1 is a longitudinal sectional view of a motor operating at a high revolutionary speed and having the journal bearing structure according to the present invention.

The present invention will be described in more detail hereinafter according to the embodiment shown in the attached drawing. An output shaft 14 having a rotor 12 fixed thereto is supported rotatively at the front and rear portions thereof by a front journal bearing 18 and a rear journal bearing 34 disposed in a motor housing, respectively. The motor housing is usually constructed by a central stator portion 10, a front housing 30 holding the front journal bearing 18, and a rear housing 44 holding the rear journal bearing 34. Furthermore, these journal bearings are lubricated by a grease.

A bearing lubricated by grease will overheat, as the condition of the grease deteriorates when the bearing is used at a high revolutionary speed such as represented by the value Dmn, which is equal to or higher than one million. This value is obtained by multiplying an average diameter of the inner and outer diameters of the journal bearing by the rotational speed and shows the degree of severity of the conditions for the operation of the journal bearing. Accordingly, an oil-air mix lubrication which supplies a small amount of oil mixed with air is required. A channel for supplying the oil-air mix and a drain channel must be provided near the journal bearing to realize this oil-air mix lubrication. As the channel for supplying the oil-air mix and the drain channel have a complex configuration and a flange portion is provided on the front and rear housings, it is difficult to directly machine the large front or rear housings 30 or 44.

Therefore, an inner portion 16 of the front housing 30 and an inner portion 32 of the rear housing 44 are constructed that they can be separated from and assembled to the front housing 30 and the rear housing 44 respectively, and thus the aforesaid machining can be easily carried out.

The inner portion 16 of the front housing 30 is divided into a main body portion 24 for holding the front journal bearing 18 and an end plate 26 abutting against the lateral end surface of the main body portion 24, whereby the machining and forming of the channel 20 for supplying an oil-air mix, and of the drain channel 22, is made easy. The front journal bearing 18 held by the main body portion 24 and the end plate 26 is fixed in the axial direction by inserting a bearing support ring 28 after the bearing 18 is inserted onto the shaft 14. Also, the main body portion 24 is fixedly attached to the remaining outer portion of the front housing 30 by, for example, screw bolts 31. The main body portion 24 and the end plate 26 are also connected to each other by, for example, screw bolts.

The inner portion 32 of the rear housing 44 is divided into a main body portion 38 for holding the rear journal bearing 34 and a support ring plate 36 for supporting the bearing in the axial direction, and thus the machining and forming of a channel 40 for supplying an oil-air mix, and of a drain channel 42, is made easy.

The output shaft 14 to be journaled by the abovementioned journal bearings 18 and 34 may be integral with the spindle of a machine tool. That is, the motor may be a type having a built-in spindle. Furthermore, if necessary, a journal bearing using a grease lubrication can be used in the present structure at the front or the rear housings.

As apparent from the foregoing description, according to the present invention, the machining and forming of the channel for supplying an oil-air mix, and of the drain channel, can be easily carried out because the front and rear housings of the motor for operating at a high revolutionary speed are constructed in such a way that they can be separated from the remaining motor housing portion, and therefore, lubrication by an oil-air mix is possible; namely, an accurately machined journal bearing structure for a high revolutionary speed motor can be provided.

We claim:

1. A structure of a journal bearing for a motor operating at a high revolutionary speed, said journal bearing comprising:
   a motor housing including a front housing, a rear housing, and a central portion, said front and rear housings each having an inner portion which can be separated from and assembled to the front and rear housings, respectively;
   said inner portion of said front housing having a main body portion and an end plate; said main body portion for housing a front journal bearing, said end plate abutting against a lateral end surface of the main body portion, said main body portion portion and said end plate forming a channel region therebetween for an oil-air mix lubrication;
   said inner portion of said rear housing having a main body portion and a support ring plate, said main body portion for housing a rear journal bearing, said support ring plate abutting against a lateral end surface of the main body portion, said main body portion and said support ring plate forming a channel region therebetween for an oil-air mix lubrication.

2. A structure of a journal bearing for a motor for operating at a high revolutionary speed according to claim 1, wherein said motor has a built-in spindle serving as a spindle of a machine tool, and an output shaft is integral with said spindle.

3. A structue of a journal bearing for a motor for operating at a high revolutionary speed according to claim 1, wherein said each inner portion of said front and rear housings has a drain region.

4. A structure of a journal bearing for a motor for operating at a high revolutionary speed according to claim 1, wherein said support ring plate supports said rear journal bearing in an axial direction.

* * * * *